US009389646B2

(12) United States Patent
Oakley

(10) Patent No.: US 9,389,646 B2
(45) Date of Patent: Jul. 12, 2016

(54) KEYBOARD PROTECTION MECHANISM

(71) Applicant: Intel Corporation, Santa Clara, CA (US)

(72) Inventor: Nicholas Oakley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 265 days.

(21) Appl. No.: 14/126,324

(22) PCT Filed: Jul. 12, 2013

(86) PCT No.: PCT/US2013/050395
§ 371 (c)(1),
(2) Date: Dec. 13, 2013

(87) PCT Pub. No.: WO2015/005939
PCT Pub. Date: Jan. 15, 2015

(65) Prior Publication Data
US 2015/0016039 A1    Jan. 15, 2015

(51) Int. Cl.
*G06F 1/16* (2006.01)
*H05K 5/00* (2006.01)
*H05K 7/00* (2006.01)

(52) U.S. Cl.
CPC ............ *G06F 1/1662* (2013.01); *G06F 1/1666* (2013.01)

(58) Field of Classification Search
CPC ............................. G06F 1/1666; G06F 1/1662
USPC ................. 361/679.8, 679.9, 679.11–679.17
See application file for complete search history.

(56) References Cited

U.S. PATENT DOCUMENTS

| 6,489,949 | B1 * | 12/2002 | Yin ....................... G06F 3/0202 361/679.11 |
| 8,289,688 | B2 | 10/2012 | Behar et al. |
| 2012/0262867 | A1 * | 10/2012 | Liu ....................... G06F 3/0221 361/679.16 |
| 2014/0355189 | A1 * | 12/2014 | Nakano ................. G06F 1/1632 361/679.11 |

FOREIGN PATENT DOCUMENTS

| JP | 2012-014022 | 1/2012 |
| KR | 10-2005-0024577 | 3/2005 |
| KR | 10-1130427 | 3/2012 |

OTHER PUBLICATIONS

PCT International Search Report and Written Opinion received for PCT International Application No. PCT/US2013/050395, mailed on Apr. 16, 2014.
PCT International Preliminary Report on Patentability received for PCT International Application No. PCT/US2013/050395, mailed on Jan. 12, 2016.

* cited by examiner

*Primary Examiner* — Bernard Rojas
(74) *Attorney, Agent, or Firm* — Patent Capital Group

(57) ABSTRACT

Particular embodiments described herein provide for an electronic device that includes a circuit board coupled to a plurality of electronic components (which includes any type of components, elements, circuitry, etc.). One particular example implementation of the electronic device includes a keyboard that includes a plurality of keys and an inter cap spacer. The inter cap spacer can be transitioned from a first position, in which a first portion of the plurality of keys are functional or operational and gaps exist between individual keys of the first portion of the plurality of keys, to a second position in which the first portion of the plurality of keys are not functional or operational and the inter cap spacer substantially fills in the gaps.

21 Claims, 10 Drawing Sheets

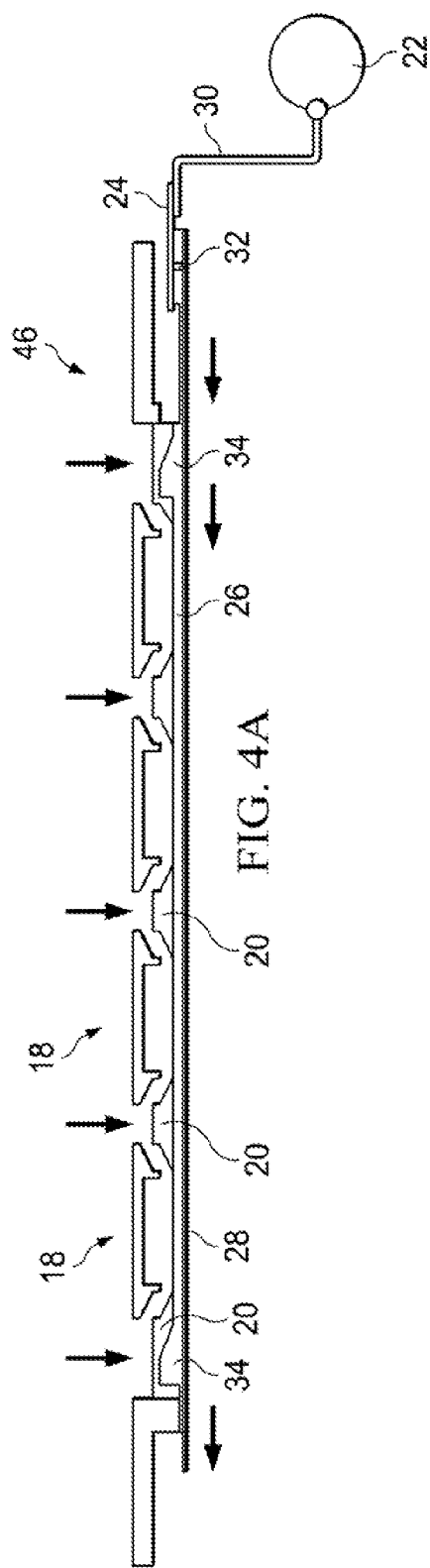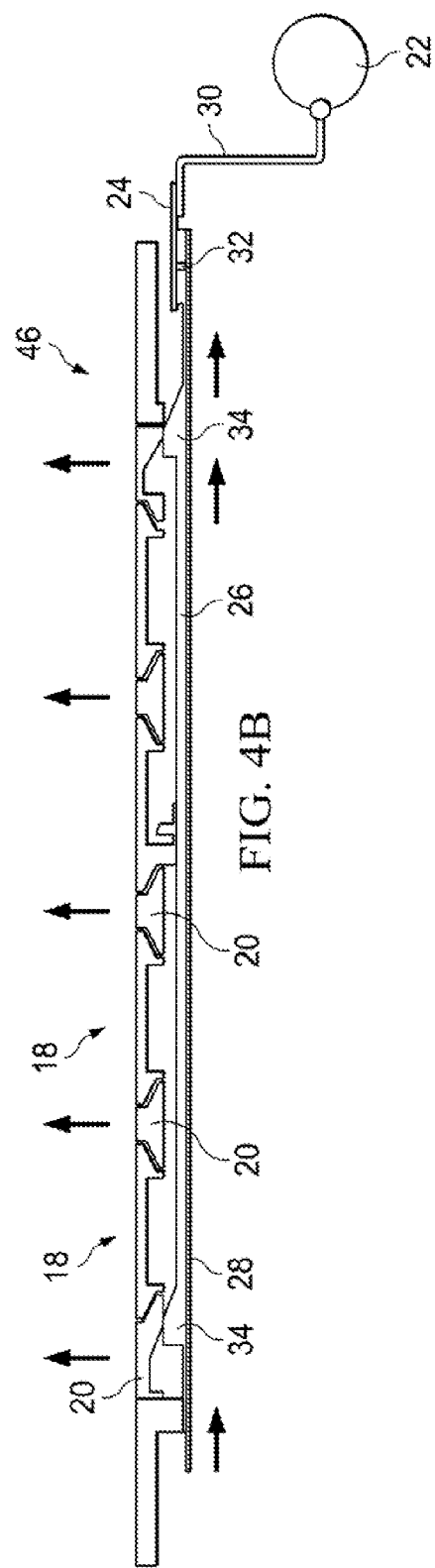

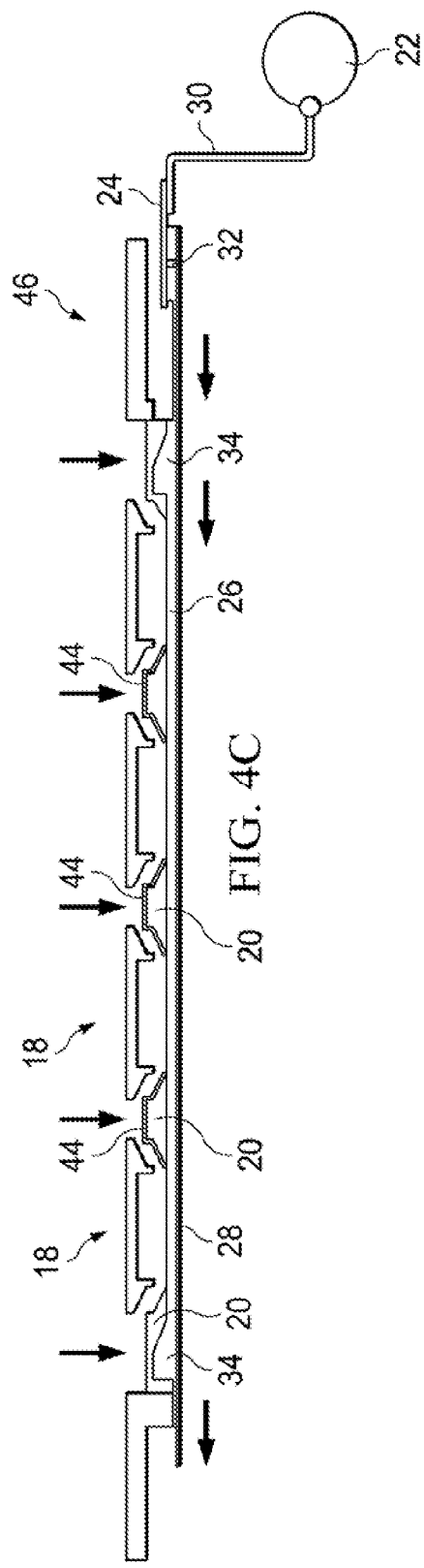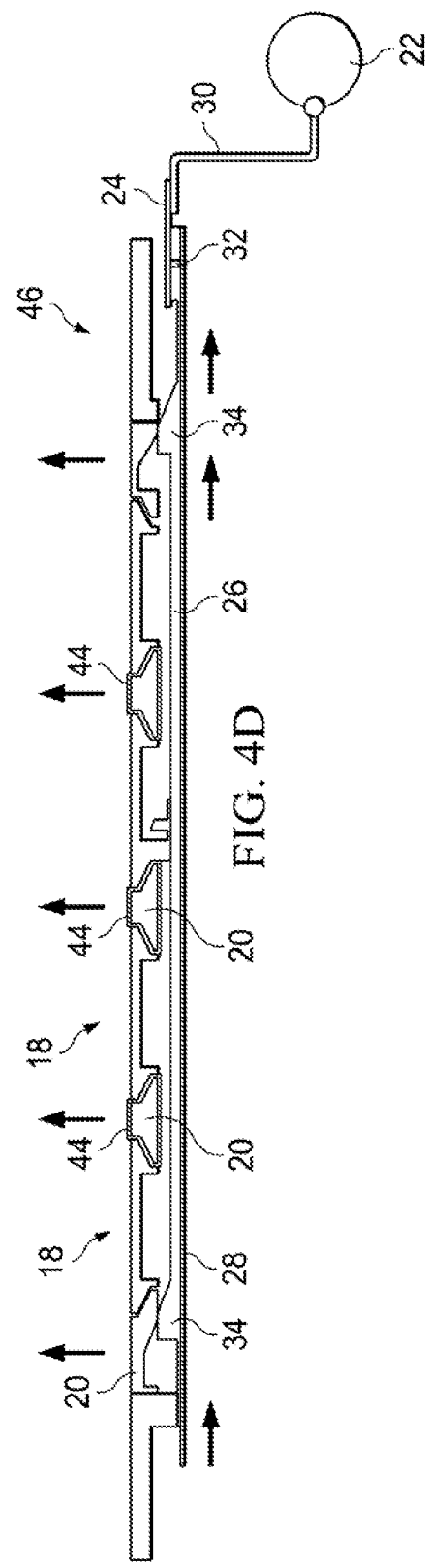

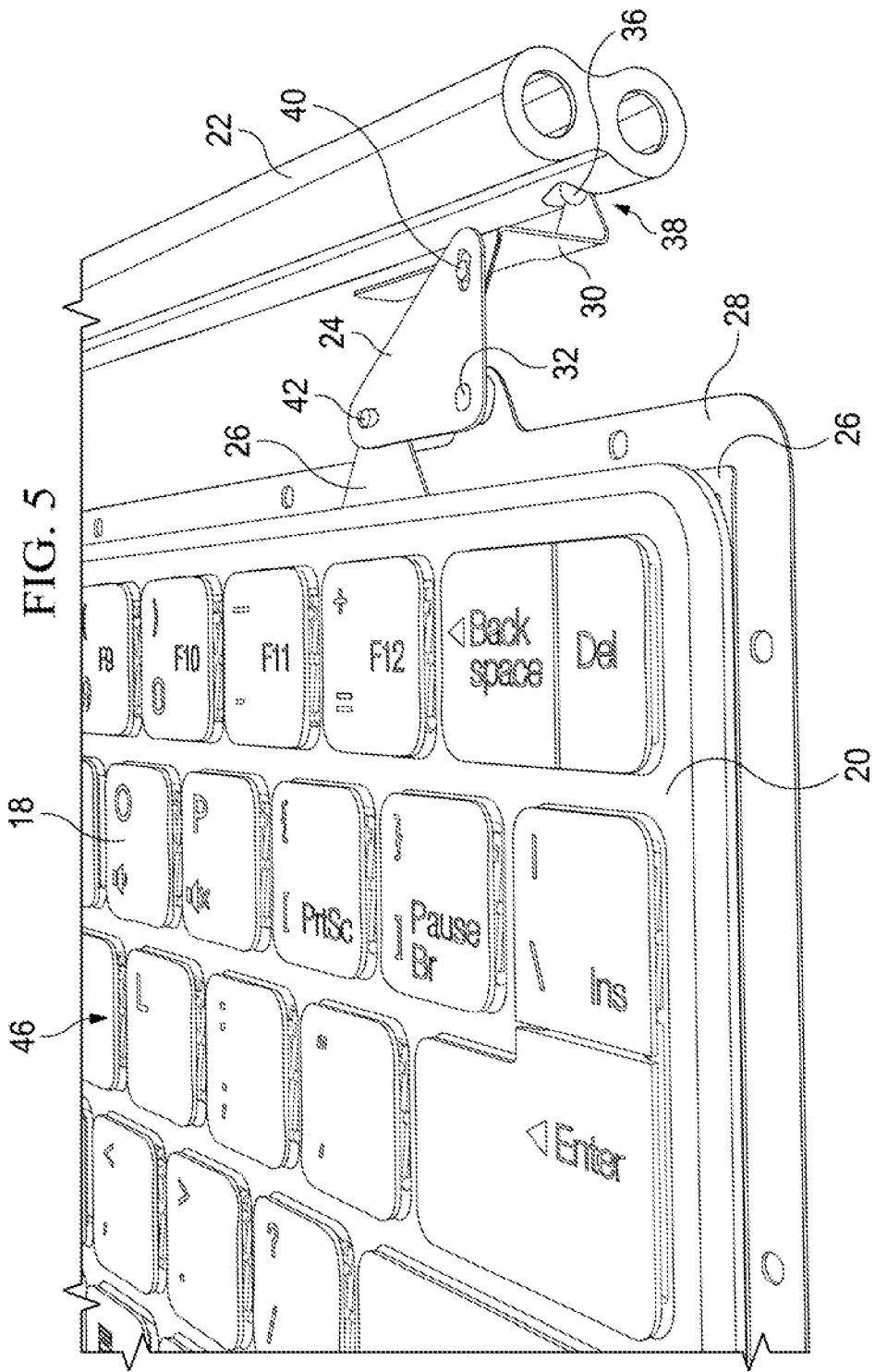

KEYBOARD PROTECTION MECHANISM

TECHNICAL FIELD

Embodiments described herein generally relate to keyboard protection mechanisms.

BRIEF DESCRIPTION OF THE DRAWINGS

Embodiments are illustrated by way of example and not by way of limitation in the FIGURES of the accompanying drawings, in which like references indicate similar elements and, in which:

FIG. 4A is a simplified cut away side view illustrating an embodiment of an electronic device, in accordance with one embodiment of the present disclosure;

FIG. 4B is a simplified cut away side view illustrating an embodiment of an electronic device, in accordance with one embodiment of the present disclosure;

FIG. 4C is a simplified cut away side view illustrating an embodiment of an electronic device, in accordance with one embodiment of the present disclosure;

FIG. 4D is a simplified cut away side view illustrating an embodiment of an electronic device, in accordance with one embodiment of the present disclosure;

FIG. 5 is a simplified orthographic view illustrating an embodiment of an electronic device, in accordance with one embodiment of the present disclosure;

The FIGURES of the drawings are not necessarily drawn to scale, as their dimensions can be varied considerably without departing from the scope of the present disclosure.

DETAILED DESCRIPTION OF EXAMPLE EMBODIMENTS

The following detailed description sets forth example embodiments of apparatuses, methods, and systems relating to keyboard protection configurations for an electronic device. Features such as structure(s), function(s), and/or characteristic(s), for example, are described with reference to one embodiment as a matter of convenience; various embodiments may be implemented with any suitable one or more of the described features.

Figure 1A:
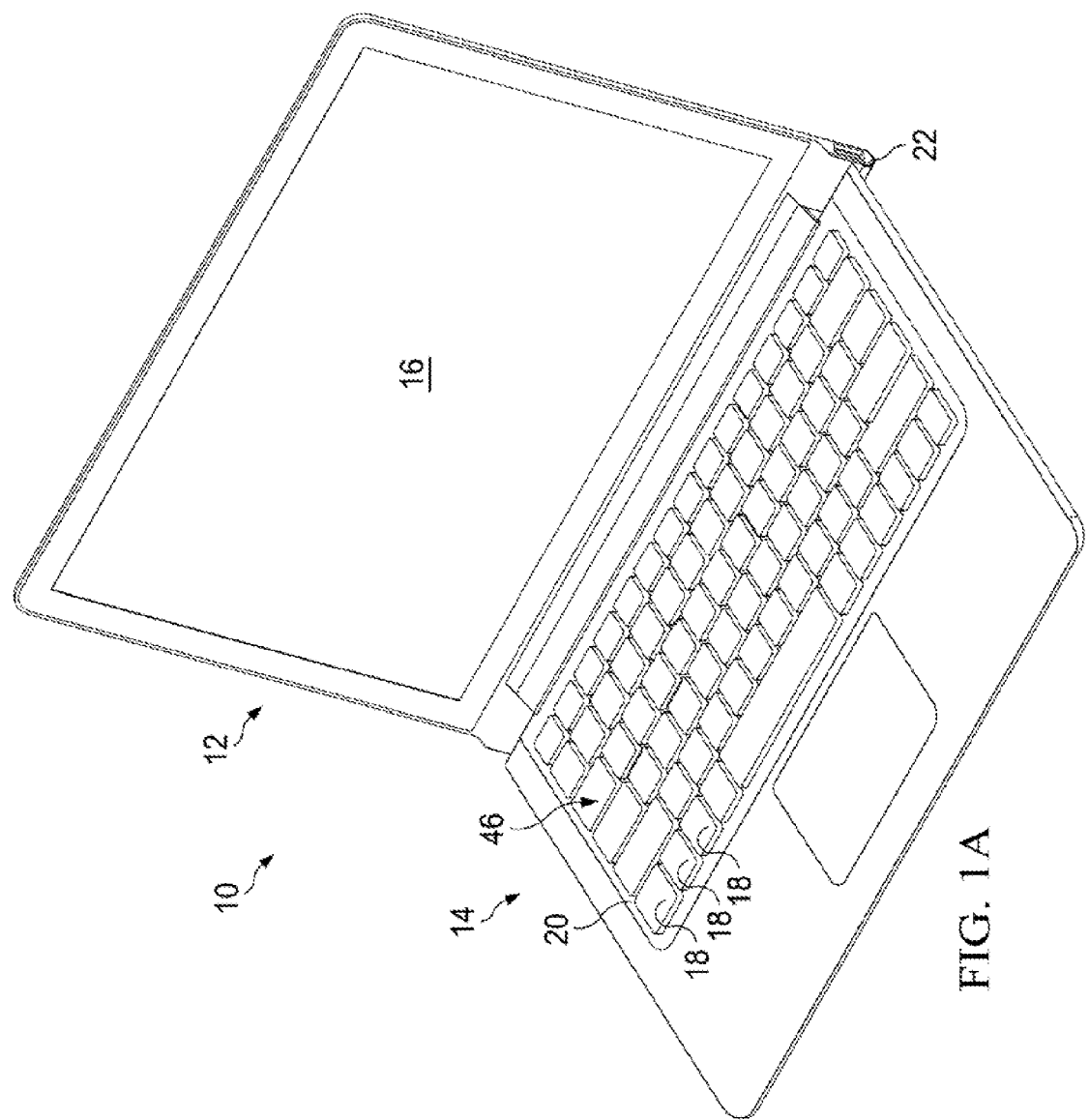
FIG. 1A is a simplified orthographic view illustrating an embodiment of an electronic device, in accordance with one embodiment of the present disclosure.

FIG. 1A is a simplified orthographic view illustrating an embodiment of an electronic device 10 in a laptop configuration in accordance with one embodiment of the present disclosure. Electronic device 10 may include a display portion 12 and a keyboard portion 14. Display portion 12 may include a display 16. Keyboard portion 14 may include a keyboard 46 and an inter cap spacer 20. Keyboard 46 may include keys 18. In the laptop configuration, keys 18 are functional and there are gaps or spaces between keys 18.

Display portion 12 and keyboard portion 14 may be connected by a hinge 22. Hinge 22 can define an axis of rotation or multiple axes of rotation that is shared between display portion 12 and keyboard portion 14. In one or more embodiments, electronic device 10 may be any suitable electronic device having a display such as a mobile device, a tablet computer and/or a tablet device (e.g., i-Pad), a personal digital assistant (PDA), a smartphone, an audio system, a movie player of any type, a computer docking station, etc. Display 16 may be a liquid crystal display (LCD), organic light-emitting diode (OLED), or some other type of display. Electronic device 10 can contain a battery and various electronics (e.g., wireless module (e.g., Wi-Fi module, Bluetooth module, etc.) processor, memory, camera, a microphone, speakers, etc.) to allow electronic device to operate.

Figure 1B:
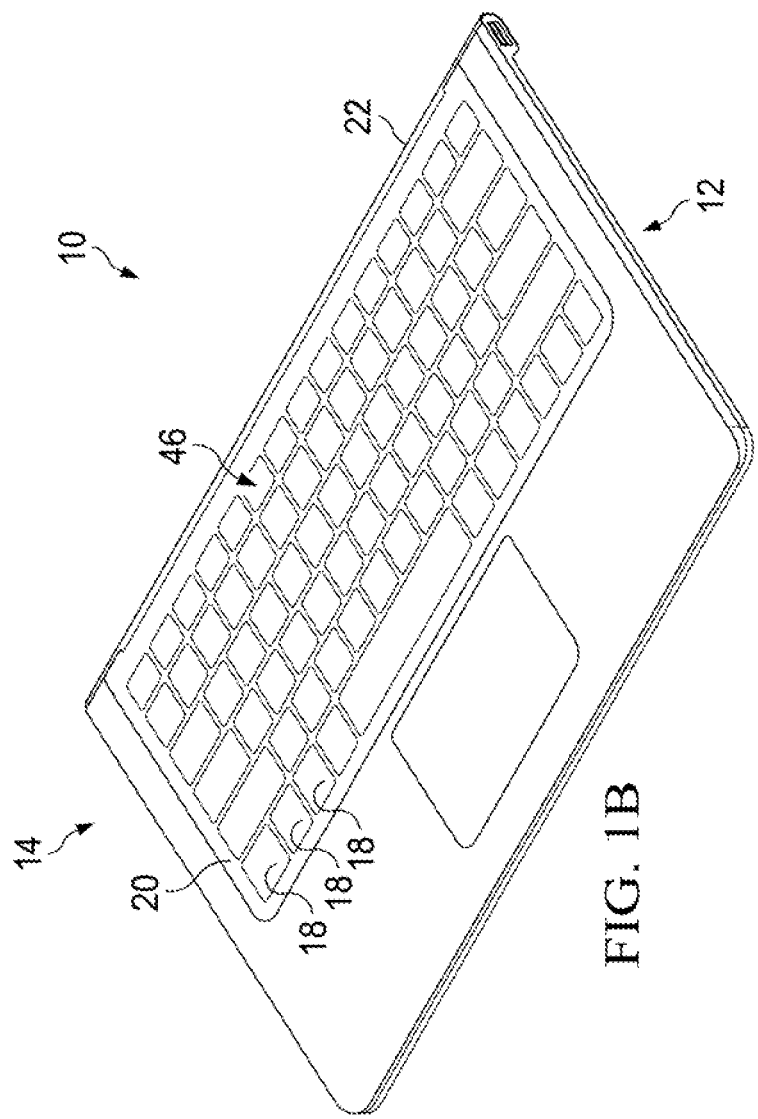
FIG. 1B is a simplified orthographic view illustrating an embodiment of an electronic device, in accordance with one embodiment of the present disclosure.

Turning to FIG. 1B, FIG. 1B is a simplified orthographic view illustrating electronic device 10 in a tablet configuration in accordance with one embodiment of the present disclosure. [Note that the display is facing downwards and FIG. 1B is illustrating the back of electronic device 10 in the tablet configuration.] As illustrated in FIG. 1B, display portion 12 has been rotated about hinge 22. This configuration allows electronic device 10 to function in a tablet configuration. In the tablet configuration, inter cap spacer 20 has been raised to a level flush (or substantially flush) with the surrounding surface and tops of the keycaps and at least partially fill in the gaps between keys 18 and provide a smooth (or relatively smooth) surface and to restrict keys 18 from movement, thus precluding keyboard inputs.

The following information may be viewed as a basis from which one or more embodiments may be explained. Although the embodiments described are related to laptops, tablets, and hybrid laptops, there may be other embodiments that deal with phone, PDAs, audio systems, etc. A hybrid laptop, (e.g., a convertible computer, fold over notebook, etc.) is a one-piece mobile computer that can include a laptop configuration (illustrated in FIG. 1A) and a tablet configuration (illustrated in FIG. 1B). To convert from the laptop configuration to the tablet configuration, often the display or screen can rotate, twist, or spin over a keyboard. While hybrid laptops are a compelling way of delivering convertibility from a laptop configuration to a tablet configuration, in some designs, when the display is folded back, the keyboard is left exposed and vulnerable to damage and inadvertent input.

In an embodiment, an electrical device can be configured to lock or restrict the keys of a keyboard in an 'up' position and facilitate some protection of the keys to help mitigate against the intrusion of foreign material (e.g., liquids such as water, particles such as dust or dirt, etc.) into the spaces (also known as gaps) between the keys. For example, an inter cap spacer may be located between the keys of the keyboard and a keyboard backplane. The inter cap spacer may be a movable part that surrounds and occupies the space between the keycaps. The inter cap spacer can be configured to rise, as the display folds or rotates back. In one example, the rotation that causes the inter cap spacer to rise may be more than about one hundred and eighty degrees (180°) from a closed laptop configuration. When the display is rotated to a position behind the keyboard, the inter cap spacer may be flush (or relatively flush) with the surface of the keys to create a smooth (or relatively smooth) surface. In an embodiment, sloped flanges on the inter cap spacer may engage with the underside of the keys to prevent the keys from being subsequently depressed. In another embodiment, tighter matching, a mating rim, or the inclusion of a soft sealing surface or membrane may help mitigate against water and dust intrusion into electronic device 10. In yet another embodiment, the keyboard may include backlit keycaps such that the backlight is switched off during the transition from the laptop configuration to the tablet configuration.

The inter cap spacer can be raised in a number of ways such as via swing arms, rotating helical lift surfaces, solenoids, etc. In a specific example, through use of bell cranks, the x-axis motion of the display being rotated around a hinge can be translated to longitudinally-axis motion that moves a riser slider. The riser slider may be integrated with one or more risers that engage the bottom of the inter cap spacer. A pin (or pins) may run on a helical track in the hinge to create the x-axis motion. As the risers move under the inter cap spacer, the inter cap spacer is forced to rise flush to the top of the keys of the keyboard, thus protecting the keys from inadvertent operation. As the display is rotated in the opposite direction, the riser is pushed (or pulled) from the riser, away from the inter cap spacer, and the inter cap spacer is lowered away from the keys. In another embodiment, springs or some other material may aid the pushing (or pulling) away from the inter cap spacer. In an embodiment, an integration of the mechanism to a keyboard backplane can allow the keyboard assembly to be attached to the underside of the surface as a single assembly.

Figure 2:
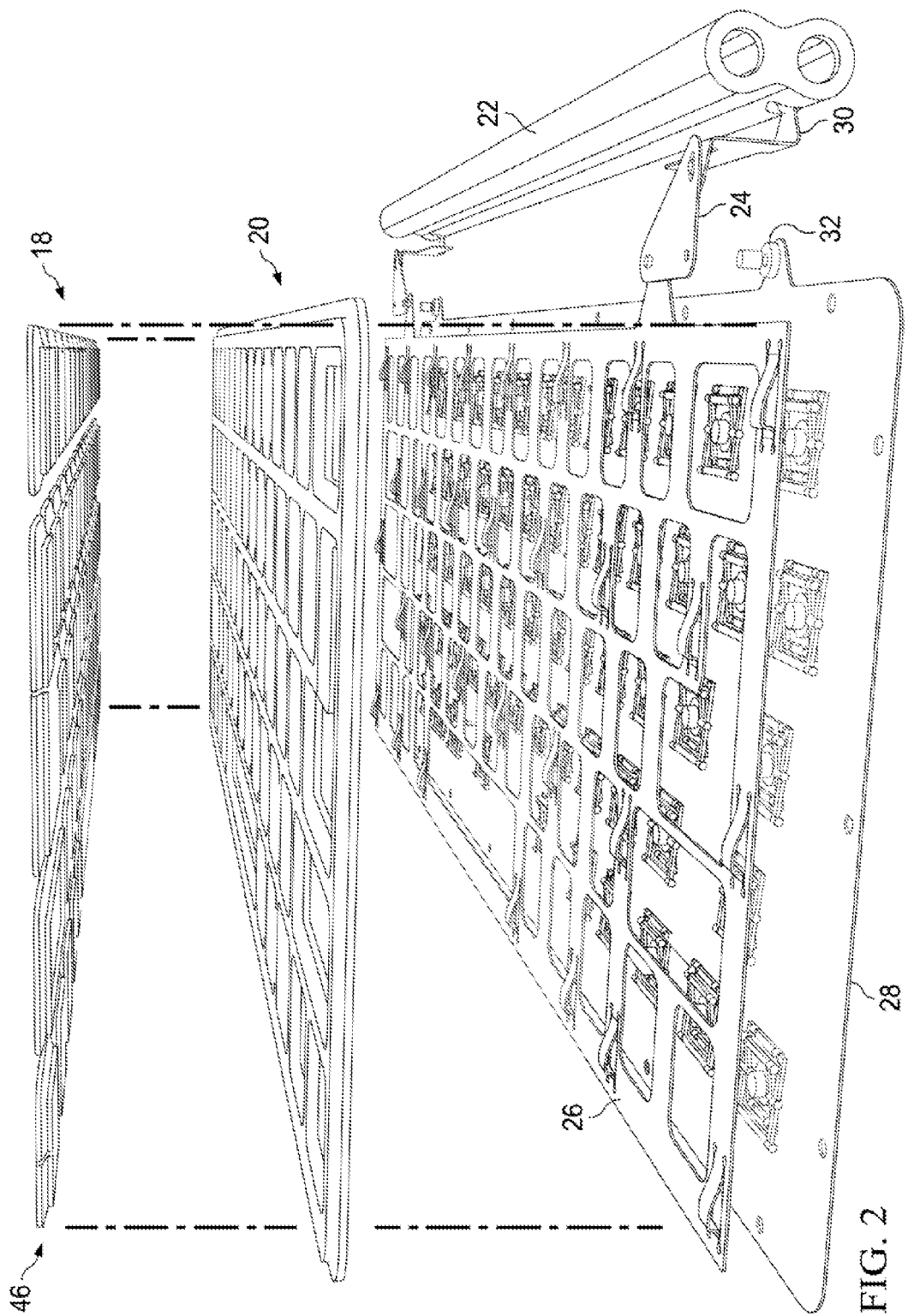
FIG. 2 is a simplified exploded orthographic view illustrating an embodiment of an electronic device, in accordance with one embodiment of the present disclosure.

Turning to FIG. 2, FIG. 2 is a simplified exploded orthographic view illustrating electronic device 10 in accordance with one embodiment of the present disclosure. Electronic device 10 can include keys 18, inter cap spacer 20, hinge 22, a bell crank 24, a riser slider 26, a keyboard backplane 28, a crank 30, and a pivot point 32. Bell crank 24 can be a lever with two arms having a common fulcrum (pivot point 32) at their junction. Bell crank 24 can include an "L" shaped crank pivoted where the two arms of the L meet. Pins (illustrated in FIG. 5) may be attached to the ends of the "L" arms of bell crank 24. In a specific embodiment, when the display is rotated about hinge 22, bell crank 24 rotates around pivot point 32, pulling on riser slider 26 and raising inter cap spacer 20.

Figure 3A:
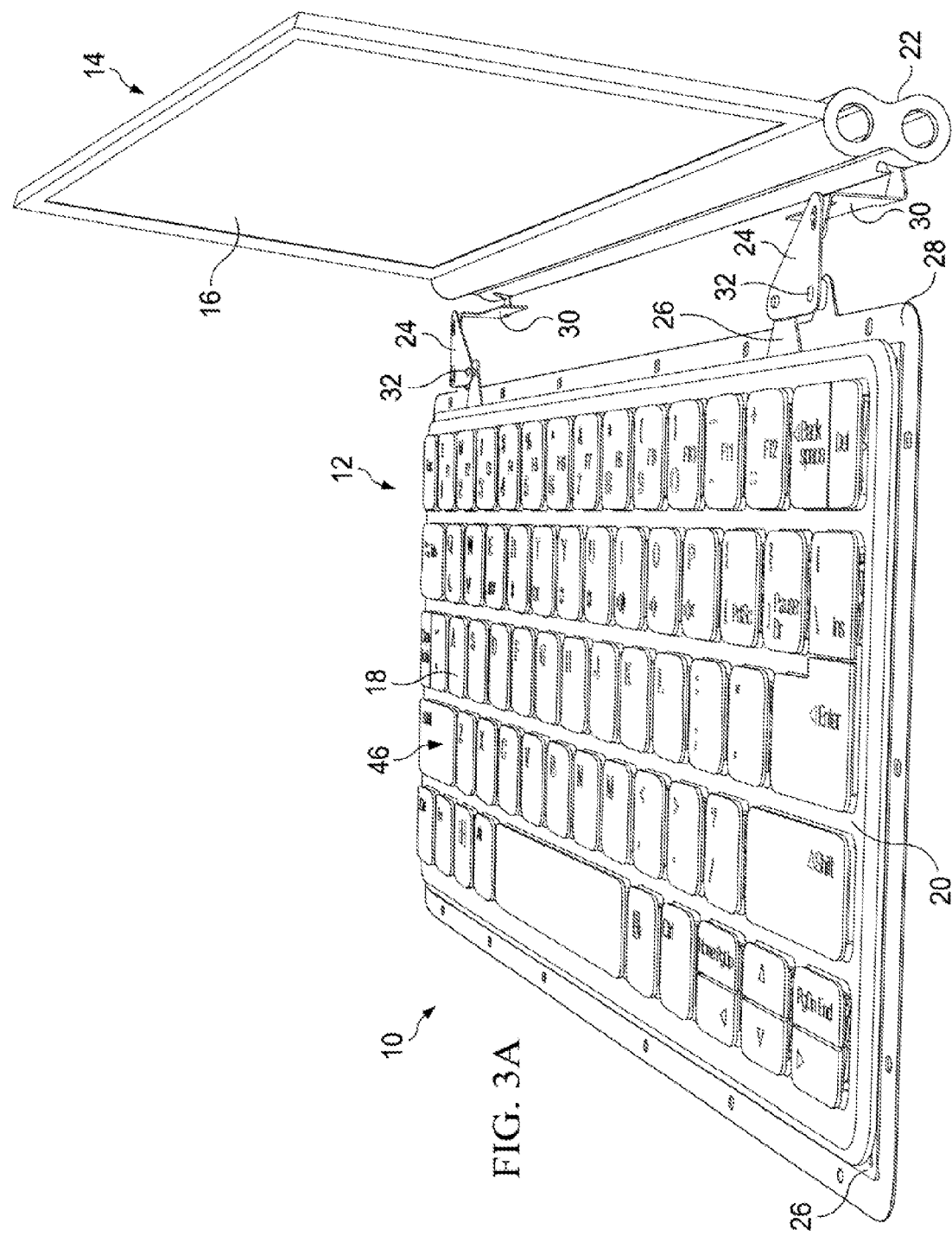
FIG. 3A is a simplified cut away orthographic view illustrating an embodiment of an electronic device, in accordance with one embodiment of the present disclosure.

Turning to FIG. 3A, FIG. 3A is a simplified cut away orthographic view illustrating electronic device 10 in accordance with one embodiment of the present disclosure. As illustrated in FIG. 3A, electronic device is in a laptop configuration and inter cap spacer 20 is below keys 18 such that there is space between keys 18. Bell crank 24 (attached to riser slider 26) is in a first or open position where riser slider 26 allows inter cap spacer 20 to rest below keys 18.

Figure 3B:
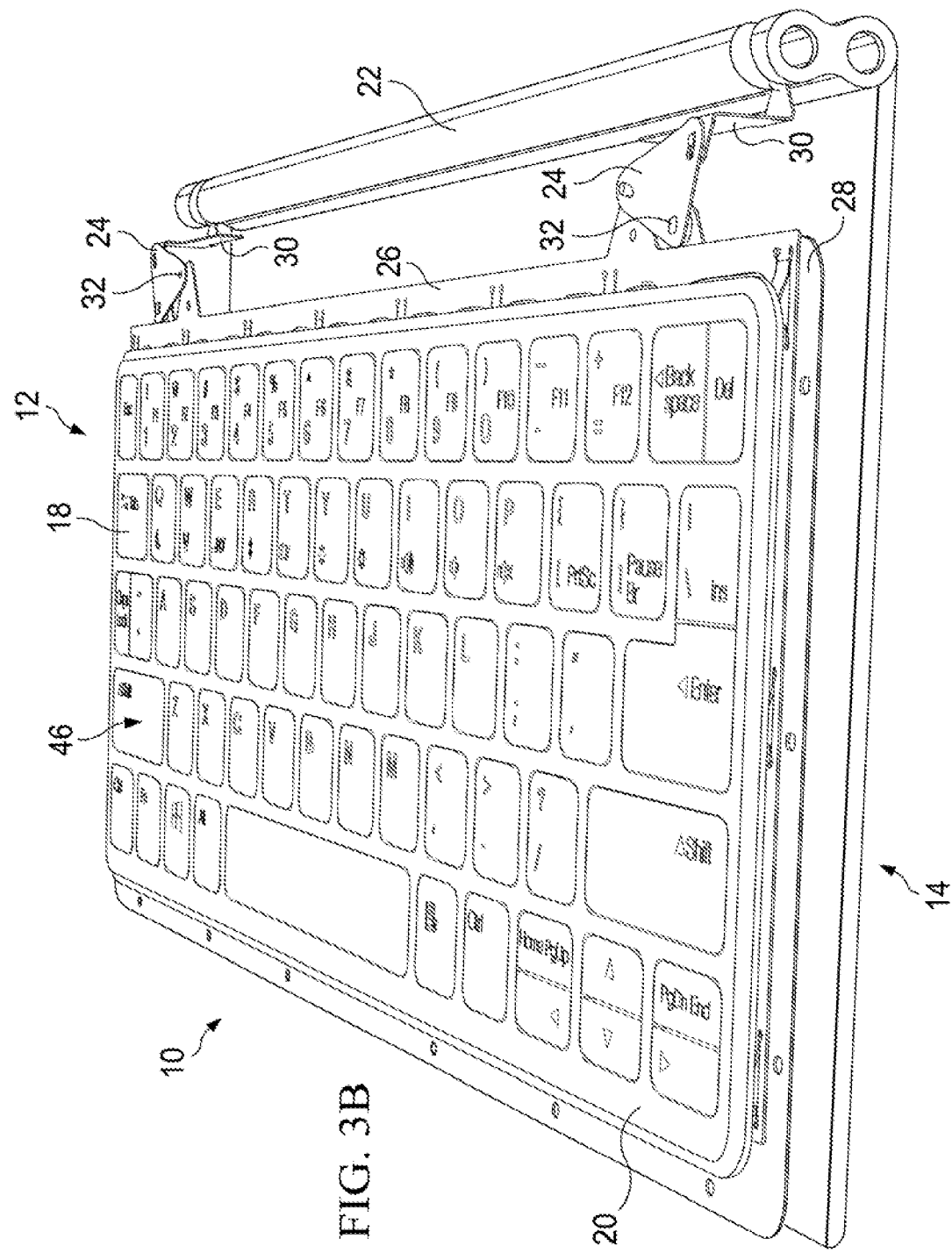
FIG. 3B is a simplified cut away orthographic view illustrating an embodiment of an electronic device, in accordance with one embodiment of the present disclosure.

Turning to FIG. 3B, FIG. 3B is a simplified cut away orthographic view illustrating electronic device 10 in accordance with one embodiment of the present disclosure. As illustrated in FIG. 3B, display portion 12 has been rotated about hinge 22 such that electronic device is in a tablet configuration. As display portion 12 is rotated about hinge 22, a helical track in hinge 22 translates rotational motion and imparts linear motion on slider 30. As a result, bell crank 24 is forced to rotate around pivot point 32, causing bell crank 24 to pull on riser slider 26. The movement of riser slider 26 causes inter cap spacer 20 to rise and fill in the gaps between keys 18.

Turning to FIG. 4A, FIG. 4A is a simplified cut away side view illustrating an embodiment of a portion of electronic device 10 in accordance with one embodiment of the present disclosure. The illustrated portion of electronic device 10 may include keys 18, inter cap spacer 20, hinge 22, bell crank 24, riser slider 26, keyboard backplane 28, crank 30, and pivot point 32. Riser slider 26 may include one or more risers 34. Electronic device 10 is illustrated in a laptop configuration (similar to FIG. 3A) and inter cap spacer 20 is below keys 18 such that there is space in between keys 18 and keys 18 are functional.

Turning to FIG. 4B, FIG. 4B is a simplified cut away side view illustrating an embodiment of a portion of electronic device 10 in accordance with one embodiment of the present disclosure. The illustrated portion of electronic device 10 is in a tablet configuration (similar to FIG. 3B) and inter cap spacer 20 has been raised to substantially fill in the gaps in between keys 18 and keys 18 are not functional. To transition from the laptop configuration of FIG. 4A to the tablet configuration of FIG. 4B, display portion 12 (not shown) has been rotated about hinge 22. As display portion 12 is rotated about hinge 22, hinge 22 translates rotational motion via a helical track to impart linear motion to slider 30, Crank 30 rotates bell crank 24 on pivot point 32, causing bell crank 24 to pull on riser slider 26. The movement of riser slider 26 causes one or more risers 34 to slide under inter cap spacer 20 and cause inter cap spacer 20 to rise and fill in the gaps between keys 18. Inter cap spacer 20 may have a profile such that, when raised to keys 18, inter cap spacer 20 engages with the underside of keys 18 and prevents or restricts keys 18 from being depressed. (In an embodiment, a tapered interface between inter cap spacer 20 and keys 18 may help prevent or restrict key 18 from being depressed.

Turning to FIG. 4C, FIG. 4C is a simplified cut away side view illustrating an embodiment a portion of electronic device 10 in accordance with one embodiment of the present disclosure. The illustrated portion of electronic device 10 may include keys 18, inter cap spacer 20, hinge 22, bell crank 24, riser slider 26, keyboard backplane 28, crank 30, and pivot point 32. Riser slider 26 may include one or more risers 34. Inter cap spacer 20 may include a membrane 44. Membrane 44 may be a soft sealing surface or other device or material that can help mitigate against water and dust intrusion into electronic device 10. Electronic device 10 is illustrated in a laptop configuration (similar to FIG. 3A) and inter cap spacer 20 is below keys 18 such that there is space in between keys 18 and keys 18 are functional.

Turning to FIG. 4D, FIG. 4D is a simplified cut away side view illustrating an embodiment of a portion of electronic device 10 in accordance with one embodiment of the present disclosure. The illustrated portion of electronic device 10 is in a tablet configuration (similar to FIG. 3B) and inter cap spacer 20 has been raised to substantially fill in the gaps in between keys 18 and keys 18 are not functional. Membrane 44 can be positioned against keys 18 to provide a seal and help mitigate against water and dust intrusion into electronic device 10. To transition from the laptop configuration of FIG. 4C to the tablet configuration of FIG. 4D, display portion 12 (not shown) has been rotated about hinge 22. As display portion 12 is rotated about hinge 22, hinge 22 pulls on crank 30. As a result, crank 30 rotates bell crank 24 on pivot point 32, causing bell crank 24 to pull on riser slider 26. The movement of riser slider 26 causes riser 34 to slide under inter cap spacer 20 and cause inter cap spacer 20 to raise and fill in the gaps between keys 18. Inter cap spacer 20 can have a profile that, when raised to keys 18, inter cap spacer 20 and membrane 44 engage with keys 18 and prevent or restrict keys 18 from being depressed. Membrane 44 may be seated or positioned against keys 18 to provide a restrictive cushion for keys 18 to restrict the movement of keys 18 and provide a seal to help mitigate against water and dust intrusion into electronic device 10.

Note that the embodiments of FIGS. 4A-4D are simply reflective of one of the many possible design choices for electronic device 10. In other cases, the shape and the size of inter cap spacer 20 may be varied considerably. For example, in certain cases, the coverage of inter cap spacer 20 may occupy only a portion of the keyboard framework. Consider a case in which a design of inter cap spacer 20 only inhibits functionality for the top row of keys (e.g., the function keys). In other cases, a design could be provided that does the opposite, in only inhibiting the functionality for the actual alpha numeric keys, whereas the function keys would continue to be systematically exposed and vulnerable to key presses, debris, etc. In yet other examples, there could be multiple tiers of inter cap spacer 20 (e.g., for possible engagement with certain keys for specific activities such as gaming, writing, watching videos, etc.). One such design can involve using inter cap spacer 20 to inhibit key functionalities, while allowing a touchpad of electronic device 10 to be completely functional.

Additionally, the way in which inter cap spacer 20 mates with the underside of any of the keys may be changed considerably. For example, any number of magnetic arrangements can be provided (where the keys themselves, or inter cap spacer 20 include magnetic materials, ferrous materials, repulsive materials, etc.). Yet other alternative embodiments may involve inhibiting the functionality of a touchpad of electronic device 10 using inter cap spacer 20. In at least one embodiment, inter cap spacer 20 covers the entire area of the keyboard, along with the area of the touchpad. In other cases, inter cap spacer 20 is intentionally designed to toggle between multiple modes of operation, where certain keys (or key groups) can be designated for non-functionality (e.g., based on particular user needs, based on a certain configuration (tablet configuration, laptop configuration, desktop configuration, video watching configuration in which at least a portion of electronic device 10 operates as a stand, etc.)).

Turning to FIG. 5, FIG. 5 is a simplified cut away side view illustrating an embodiment of an electronic device 10 in accordance with one embodiment of the present disclosure. Electronic device 10 can include keyboard 46, keys 18, inter cap spacer 20, hinge 22, bell crank 24, riser slider 26, keyboard backplane 28, crank 30, pivot point 32, a hinge pin 36, a helical slot 38, a crank pin 40, and a riser slider pin 42. When electronic device 10 transitions from a laptop configuration to a tablet configuration (or from a tablet configuration to a laptop configuration), hinge 22 rotates and causes hinge pin 36 to move crank 30. Helical slot 38 accommodates the movement of crank 30 and hinge pin 36. The movement of crank 30 is transferred to bell crank 24 using crank pin 40 and bell crank 24 rotates on pivot point 32. As bell crank 24 rotates on pivot point 32, riser slider pin 42 transfers the movement to riser slider 26. For example, if electronic device is transitioning from a laptop configuration to a tablet configuration, display portion 12 (not shown) may be rotated to a position behind keyboard portion 14. This causes hinge 22 to rotate and hinge pin 36 to cause crank 30 (using crank pin 40) to pivot bell crank 24 on pivot point 32. As bell crank 24 is rotated on pivot point 32, bell crank pulls (or pushes) against riser slider pin 42 and slides riser slider 26. Such action causes riser 34 to slide under inter cap spacer 20 and raise inter cap spacer 20 (or lower if riser 34 slides away from inter cap spacer 20).

Figure 6:
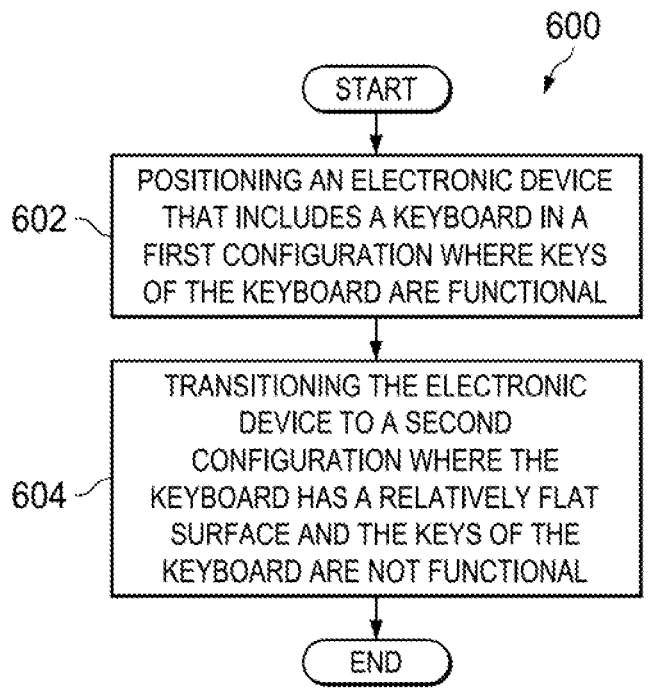
FIG. 6 illustrates, for at least one embodiment, a flow diagram in accordance with at least one embodiment of the present disclosure.

FIG. 6 is a simplified flowchart 600 illustrating example activities of a keyboard protection mechanism in accordance with at least one example embodiment of the present disclosure. 602 can include positioning an electronic device that includes a keyboard in a first configuration in which keys of the keyboard are functional. For example, the electronic device may be in a laptop configuration. 604 can include transitioning the electronic device to a second configuration in which the keyboard has a substantially flat surface and the keys of the keyboard are not functional. For example, the electronic device may be transitioned from a laptop configuration to a tablet configuration. During the transition, an inter cap spacer or some other component may be raised or otherwise moved to fill in the space between the keys and to restrict the keys from movement.

Figure 7:
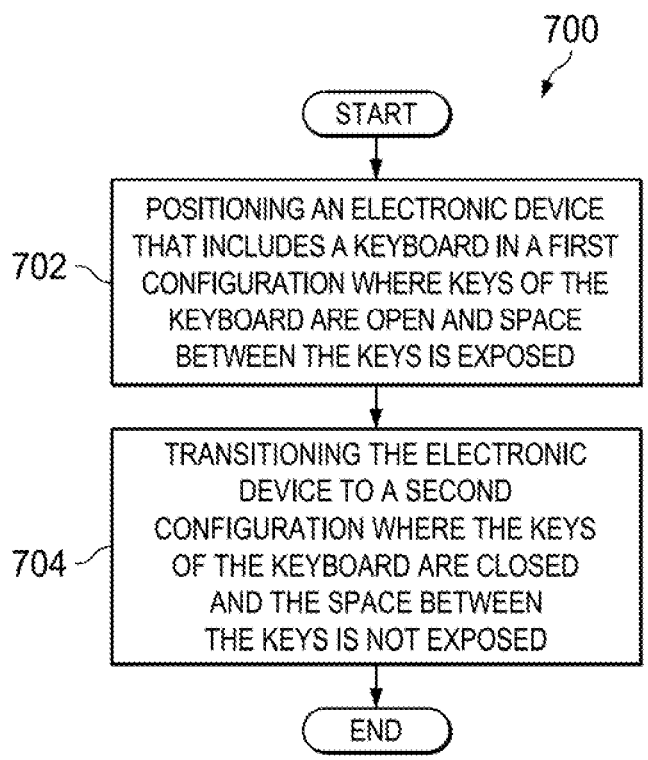
FIG. 7 illustrates, for at least one embodiment, a flow diagram in accordance with t least one embodiment of the present disclosure.

FIG. 7 is a simplified flowchart 700 illustrating example activities of a keyboard protection mechanism in accordance with at least one example embodiment of the present disclosure. 702 can include positioning an electronic device that includes a keyboard in a first configuration in which keys of the keyboard are open (i.e., free to move up and down) and space between the keys is exposed. For example, the electronic device may be in a laptop configuration. 704 can include transitioning the electronic device to a second configuration where the keys of the keyboard are closed (i.e., not free to move up and down) and the space between the keys is not exposed. For example, the electronic device may be transitioned from a laptop configuration to a tablet configuration. During the transition, an inter cap spacer with a membrane or some other device may be raised or otherwise moved to fill in the space between the keys and to restrict the keys from movement.

It should be noted that any type of signaling can be exchanged within electronic device 10 in order to execute, initiate, assist, etc. any of the operations, activities, and configurations discussed previously. For example, an electronic signal (actuation) can be used to switch between configurations. In other cases, an electronic signal can be used (in conjunction with any of the previously described activities) to prohibit certain keys from being functional, allowing other keys to be functional, etc. Such a signal could be concurrent or contemporaneous with the activities of inter cap spacer 20, or each of these elements could trigger the other.

Figure 8:
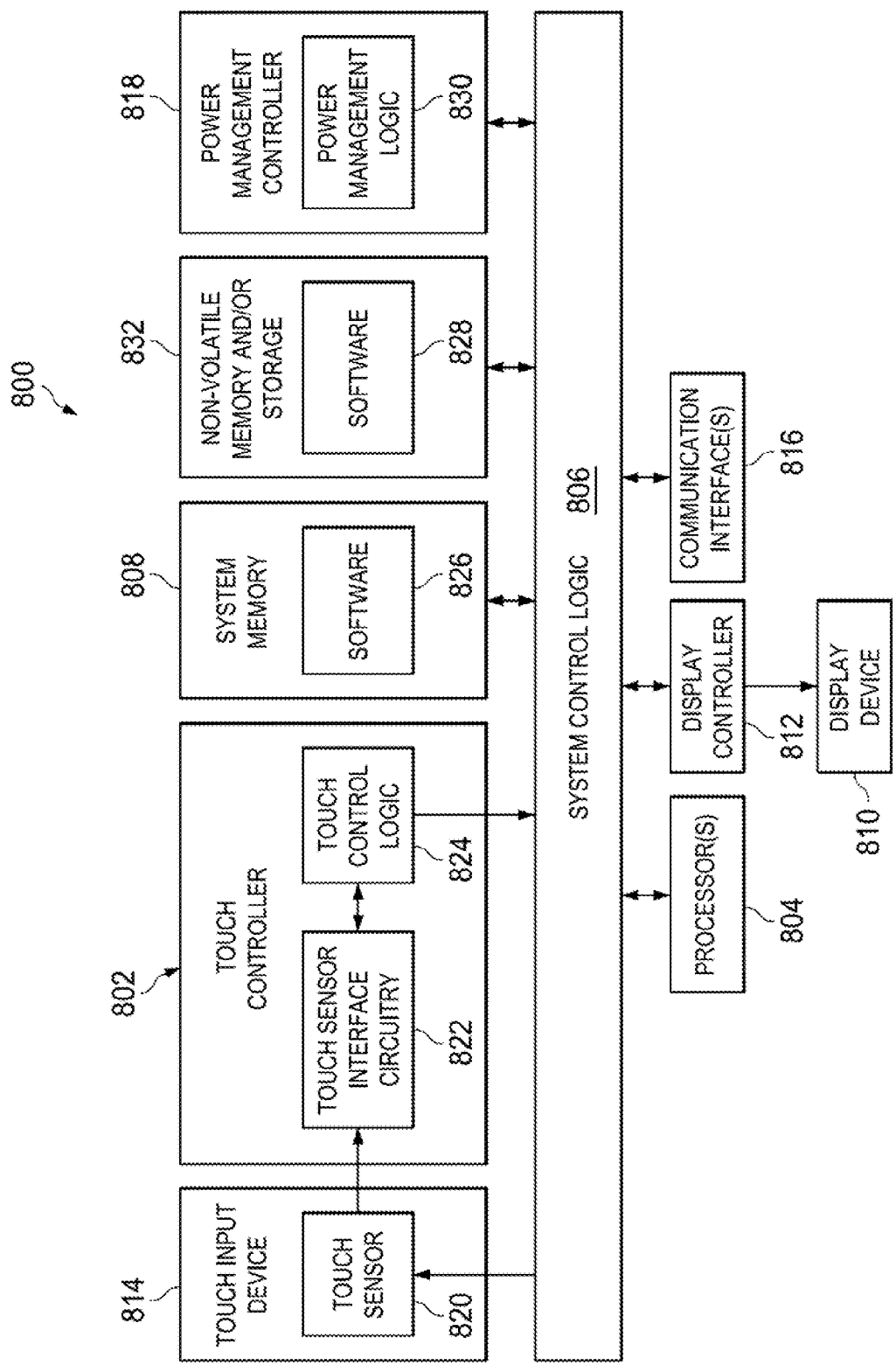
FIG. 8 is a simplified block diagram illustrating potential electronics and logic that may be associated with one embodiment of the electronic device.

FIG. 8 is a simplified block diagram illustrating potential electronics and logic that may be associated with electronic device 10 discussed herein. In at least one example embodiment, system 800 can include a touch controller 802, one or more processors 804, system control logic 806 coupled to at least one of processor(s) 804, system memory 808 coupled to system control logic 806, non-volatile memory and/or storage device(s) 832 coupled to system control logic 806, display controller 812 coupled to system control logic 806, display controller 812 coupled to a display device 810, power management controller 818 coupled to system control logic 806, and/or communication interfaces 816 coupled to system control logic 806.

Hence, the basic building blocks of any computer system (e.g., processor, memory, I/O, display, etc.) can be used in conjunction with the teachings of the present disclosure. Certain components could be discrete or integrated into a System on Chip (SoC). Some general system implementations can include certain types of form factors in which system 800 is part of a more generalized enclosure. In alternate implementations, instead of notebook device/laptops, etc., certain alternate embodiments deal with mobile phones, tablet devices, etc.

System control logic 806, in at least one embodiment, can include any suitable interface controllers to provide for any suitable interface to at least one processor 804 and/or to any suitable device or component in communication with system control logic 806. System control logic 806, in at least one embodiment, can include one or more memory controllers to provide an interface to system memory 808. System memory 808 may be used to load and store data and/or instructions, for example, for system 800. System memory 808, in at least one embodiment, can include any suitable volatile memory, such as suitable dynamic random access memory (DRAM) for example. System control logic 806, in at least one embodiment, can include one or more I/O controllers to provide an interface to display device 810, touch controller 802, and non-volatile memory and/or storage device(s) 832.

Non-volatile memory and/or storage device(s) 832 may be used to store data and/or instructions, for example within software 828. Non-volatile memory and/or storage device(s) 832 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 818 may include power management logic 830 configured to control various power management and/or power saving functions. In at least one example embodiment, power management controller 818 is configured to reduce the power consumption of components or devices of system 800 that may either be operated at reduced power or turned off when the electronic device is in a closed configuration. For example, in at least one embodiment, when the electronic device is in a closed configuration, power management controller 818 performs one or more of the following: power down the unused portion of the display and/or any backlight associated therewith; allow one or more of processor(s) 804 to go to a lower power state if less computing power is required in the closed configuration; and shutdown any devices and/or components that are unused when an electronic device is in the closed configuration.

Communications interface(s) 816 may provide an interface for system 800 to communicate over one or more networks and/or with any other suitable device. Communications interface(s) 816 may include any suitable hardware and/or firmware. Communications interface(s) 816, in at least one example embodiment, may include, for example, a network adapter, a wireless network adapter, a telephone modem, and/or a wireless modem. System control logic 806, in at least one embodiment, can include one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one embodiment, at least one processor 804 may be packaged together with logic for one or more controllers of system control logic 806. In at least one embodiment, at least one processor 804 may be packaged together with logic for one or more controllers of system control logic 806 to form a System in Package (SiP). In at least one embodiment, at least one processor 804 may be integrated on the same die with logic for one or more controllers of system control logic 806. For at least one embodiment, at least one processor 804 may be integrated on the same die with logic for one or more controllers of system control logic 806 to form a System on Chip (SoC).

For touch control, touch controller 802 may include touch sensor interface circuitry 822 and touch control logic 824. Touch sensor interface circuitry 822 may be coupled to detect touch input over a first touch surface layer and a second touch surface layer of a display (i.e., display device 810). Touch sensor interface circuitry 822 may include any suitable circuitry that may depend, for example, at least in part on the touch-sensitive technology used for a touch input device. Touch sensor interface circuitry 822, in one embodiment, may support any suitable multi-touch technology. Touch sensor interface circuitry 822, in at least one embodiment, can include any suitable circuitry to convert analog signals corresponding to a first touch surface layer and a second surface layer into any suitable digital touch input data. Suitable digital touch input data for at least one embodiment may include, for example, touch location or coordinate data.

Touch control logic 824 may be coupled to help control touch sensor interface circuitry 822 in any suitable manner to detect touch input over a first touch surface layer and a second touch surface layer. Touch control logic 824 for at least one example embodiment may also be coupled to output in any suitable manner digital touch input data corresponding to touch input detected by touch sensor interface circuitry 822. Touch control logic 824 may be implemented using any suitable logic, including any suitable hardware, firmware, and/or software logic (e.g., non-transitory tangible media), that may depend, for example, at least in part on the circuitry used for touch sensor interface circuitry 822. Touch control logic 824 for at least one embodiment may support any suitable multi-touch technology.

Touch control logic 824 may be coupled to output digital touch input data to system control logic 806 and/or at least one processor 804 for processing. At least one processor 804 for at least one embodiment may execute any suitable software to process digital touch input data output from touch control logic 824. Suitable software may include, for example, any suitable driver software and/or any suitable application software. As illustrated in FIG. 8, system memory 808 may store suitable software 826 and/or non-volatile memory and/or storage device(s).

Note that with the examples provided above, as well as numerous other examples provided herein, interaction may be described in terms of layers, protocols, interfaces, spaces, and environments more generally. However, this has been done for purposes of clarity and example only. In certain cases, it may be easier to describe one or more of the functionalities of a given set of flows by only referencing a limited number of components. It should be appreciated that the architectures discussed herein (and its teachings) are readily scalable and can accommodate a large number of components, as well as more complicated/sophisticated arrangements and configurations. Accordingly, the examples provided should not limit the scope or inhibit the broad teachings of the present disclosure, as potentially applied to a myriad of other architectures.

It is also important to note that a number of operations have been described as being executed concurrently with, or in parallel to, one or more additional operations. However, the timing of these operations may be altered considerably. The preceding examples and operational flows have been offered for purposes of example and discussion. Substantial flexibility is provided by the present disclosure in that any suitable arrangements, chronologies, configurations, and timing mechanisms may be provided without departing from the teachings provided herein.

It is also imperative to note that all of the Specifications, and relationships outlined herein (e.g., specific commands, timing intervals, supporting ancillary components, etc.) have only been offered for purposes of example and teaching only. Each of these may be varied considerably without departing from the spirit of the present disclosure, or the scope of the appended claims. The specifications apply to many varying and non-limiting examples and, accordingly, they should be construed as such. In the foregoing description, examples have been described. Various modifications and changes may be made to such examples without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

Example Embodiment Implementations

One particular example implementation of an electronic device may include activities associated transitioning an inter cap spacer located under keys of a keyboard from a first position, in which a first portion of the keys are functional and gaps exist between individual keys of the first portion of the keys, to a second position in which the first portion of the keys are not functional and the inter cap spacer substantially fills in the gaps. The inter cap spacer may include a membrane that at least partially fills the gaps between the keys of the keyboard and mitigate the intrusion of foreign material. In another example, the inter cap spacer may transition from the first position to the second position when an electronic device is transitioned from a laptop configuration to a tablet configuration. In yet another example, the inter cap spacer may transition from the first position to the second position when a display is rotated via a hinge. The electronic device may include a riser slider that rises the inter cap spacer to substantially fill in the gaps between the keys of the keyboard when the inter cap spacer transitions from the first position to the second position.

In another example implementation, a system is provided that includes means for transitioning an inter cap spacer located under keys of a keyboard from a first position, in which a first portion of the keys are functional and gaps exist between individual keys of the first portion of the keys, to a second position in which the first portion of the keys are not functional and the inter cap spacer substantially fills in the gaps.

Other Notes and Examples

Example A1 is an electronic device that includes a keyboard that includes a plurality of keys and an inter cap spacer. The inter cap spacer can be transitioned from a first position, in which a first portion of the keys are functional and gaps exist between individual keys of the first portion of the keys, to a second position in which the first portion of the keys are not functional and the inter cap spacer substantially fills in the gaps.

In Example A2, the subject matter of Example A1 may optionally include where the inter cap spacer includes a membrane that helps fill the gaps and that mitigates against an intrusion of foreign material into recesses of the keyboard.

In Example A3, the subject matter of any of the preceding 'A' Examples can optionally include a display. In Example A4, the subject matter of any of the preceding 'A' Examples can optionally include where the inter cap spacer transitions from the first position to the second position when the electronic device is transitioned from a laptop configuration to a tablet configuration.

In Example A5, the subject matter of any of the preceding 'A' Examples can optionally include where the inter cap spacer transitions from the first position to the second position when the display is rotated via a hinge. In Example A6, the subject matter of any of the preceding 'A' Examples can optionally include a bell crank that is to use a rotational force associated with the hinge to transition the inter cap spacer from the first position to the second position. In Example A7, the subject matter of any of the preceding 'A' Examples can optionally include a riser slider, where the riser slider includes a riser that rises the inter cap spacer to substantially fill in the gaps between the keys of the keyboard when the inter cap spacer transitions from the first position to the second position. In Example A8, the subject matter of any of the preceding 'A' Examples can optionally include where when the inter cap spacer is in the second position, the inter cap spacer and the keys form a substantially surface.

Example AA1 can include an electronic device that includes a keyboard portion (e.g., a housing, an enclosure, etc.), a plurality of keys, an inter cap spacer, a riser slider, and a keyboard backplane, where the inter cap spacer can be transitioned from a first position, in which a first portion of the keys are functional and gaps exist between individual keys of the first portion of the keys, to a second position in which the first portion of the keys are not functional and the inter cap spacer substantially fills in the gaps.

In Example AA2, the subject matter of any of the preceding 'AA' Examples can optionally include where the inter cap spacer includes a membrane that helps fill the gaps and that mitigates against an intrusion of foreign material into recesses of the keyboard. In Example AA3, the subject matter of any of the preceding 'AA' Examples can optionally include where the inter cap spacer transitions from the first position to the second position when the electronic device is transitioned from a laptop configuration to a tablet configuration.

In Example AA4, the subject matter of any of the preceding 'AA' Examples can optionally include a display, where the inter cap spacer transitions from the first position to the second position when the display is rotated via a hinge. In Example AA5, the subject matter of any of the preceding 'AA' Examples can optionally include where the keyboard portion further includes a bell crank that is to use a rotational force associated with the hinge to transition the inter cap spacer from the first position to the second position.

In Example AA6, the subject matter of any of the preceding 'AA' Examples can optionally include where the riser slider includes a riser that rises the inter cap spacer to substantially fill in the gaps between the keys of the keyboard when the inter cap spacer transitions from the first position to the second position.

Example M1 is a method that includes transitioning an inter cap spacer located under keys of a keyboard from a first position, in which a first portion of the keys are functional and gaps exist between individual keys of the first portion of the keys, to a second position in which the first portion of the keys are not functional and the inter cap spacer substantially fills in the gaps. In Example M2, the subject matter of any of the preceding 'M' Examples can optionally include where the inter cap spacer includes a membrane that at least partially fills the gaps and that mitigates against an intrusion of foreign material into recesses of the keyboard.

In Example M3, the subject matter of any of the preceding 'M' Examples can optionally include where the inter cap spacer transitions from the first position to the second position when an electronic device is transitioned from a laptop configuration to a tablet configuration. In Example M4, the subject matter of any of the preceding 'M' Examples can optionally include where the inter cap spacer transitions from the first position to the second position when a display is rotated via a hinge.

In Example M5, the subject matter of any of the preceding 'M' Examples can optionally include a bell crank that is to use a rotational force associated with the hinge to transition the inter cap spacer from the first position to the second position. In Example M6, the subject matter of any of the preceding 'M' Examples can optionally include where a riser slider includes a riser that rises the inter cap spacer to substantially fill in the gaps between the keys of the keyboard when the inter cap spacer transitions from the first position to the second position.

An example system S1 can include means for positioning an inter cap spacer provided under keys of a keyboard into a first position, in which a first portion of the keys are functional and gaps exist between individual keys of the first portion of the keys. The system can also include transitioning to a second position in which the first portion of the keys are not functional and the inter cap spacer substantially fills in the gaps.

Example X1 is a machine-readable storage medium including machine-readable instructions to implement a method or realize an apparatus as in any one of the Examples A1-A8, AA1-AA6, M1-M6. Example Y1 is an apparatus comprising means for performing of any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. An electronic device, comprising:
   a keyboard that includes a plurality of keys; and
   an inter cap spacer, wherein the inter cap spacer can be transitioned from a first position, in which a first portion of the plurality of keys are operational and gaps exist between individual keys of the first portion of the plurality of keys, to a second position in which the first portion of the plurality of keys are not operational and the inter cap spacer substantially fills in the gaps.

2. The electronic device of claim 1, wherein the inter cap spacer includes a membrane that helps to fill the gaps and that mitigates against an intrusion of foreign material into recesses of the keyboard.

3. The electronic device of claim 1, further comprising a display.

4. The electronic device of claim 1, wherein the inter cap spacer transitions from the first position to the second position when the electronic device is transitioned from a laptop configuration to a tablet configuration.

5. The electronic device of claim 1, wherein the inter cap spacer transitions from the first position to the second position when a display is rotated via a hinge.

6. The electronic device of claim 5, further comprising:
   a bell crank that is to use a rotational force associated with the hinge to transition the inter cap spacer from the first position to the second position.

7. The electronic device of claim 5, further comprising:
   a riser slider that includes a riser that rises the inter cap spacer to substantially fill in the gaps when the inter cap spacer transitions from the first position to the second position.

8. The electronic device of claim 1, wherein when the inter cap spacer is in the second position, the inter cap spacer and the plurality of keys form a substantially flat surface.

9. An electronic device, comprising:
   a keyboard portion that includes a plurality of keys;
   an inter cap spacer;
   a riser slider; and
   a keyboard backplane, wherein the inter cap spacer can be transitioned from a first position, in which a first portion of the plurality of keys are operational and gaps exist between individual keys of the first portion of the plurality of keys, to a second position in which the first portion of the plurality of keys are not operational and the inter cap spacer substantially fills in the gaps.

10. The electronic device of claim 9, wherein the inter cap spacer includes a membrane that helps fill the gaps and that mitigates against an intrusion of foreign material into recesses of the keyboard.

11. The electronic device of claim 9, wherein the inter cap spacer transitions from the first position to the second position when the electronic device is transitioned from a laptop configuration to a tablet configuration.

12. The electronic device of claim 9, further comprising:
    a display, wherein the inter cap spacer transitions from the first position to the second position when the display is rotated via a hinge.

13. The electronic device of claim 9, further comprising:
    a plurality of sloped flanges on the inter cap spacer to engage with an underside of at least some of the plurality of keys to prevent subsequent key depression.

14. The electronic device of claim 9, wherein the riser slider includes a riser that rises the inter cap spacer to substantially fill in the gaps between the keys of the keyboard when the inter cap spacer transitions from the first position to the second position.

15. A method, comprising:
    transitioning an inter cap spacer located under keys of a keyboard from a first position, in which a first portion of the keys are operational and gaps exist between individual keys of the first portion of the keys, to a second position in which the first portion of the keys are not operational and the inter cap spacer substantially fills in the gaps.

16. The method of claim 15, wherein the inter cap spacer includes a membrane that at least partially fills the gaps and that mitigates against an intrusion of foreign material into recesses of the keyboard.

17. The method of claim 15, wherein the inter cap spacer transitions from the first position to the second position when an electronic device is transitioned from a laptop configuration to a tablet configuration.

18. The method of claim 15, wherein the inter cap spacer transitions from the first position to the second position when a display is rotated via a hinge.

19. The method of claim 18, wherein a bell crank that is to use a rotational force associated with the hinge to transition the inter cap spacer from the first position to the second position.

20. The method of claim 15, wherein a riser slider includes a riser that rises the inter cap spacer to substantially fill in the gaps between the keys of the keyboard when the inter cap spacer transitions from the first position to the second position.

21. A system, comprising:
means for positioning an inter cap spacer located under keys of a keyboard to a first position, in which a first portion of the plurality of keys are operational and gaps exist between individual keys of the first portion of the plurality of keys; and
means for transitioning to a second position in which the first portion of the plurality of keys are not operational and the inter cap spacer substantially fills in the gaps.

* * * * *